Feb. 23, 1932.  H. KATTWINKEL  1,846,560
FRICTIONAL BODY FOR COUPLINGS AND THE LIKE AND METHOD OF MAKING SAME
Filed March 17, 1927    2 Sheets-Sheet 1

Inventor;
Hans Kattwinkel,
By his Atty, Harold D. Penney

Feb. 23, 1932.   H. KATTWINKEL   1,846,560
FRICTIONAL BODY FOR COUPLINGS AND THE LIKE AND METHOD OF MAKING SAME
Filed March 17, 1927   2 Sheets-Sheet 2

Inventor;
Hans Kattwinkel,
By his Atty,
Harold D. Penney

Patented Feb. 23, 1932

1,846,560

UNITED STATES PATENT OFFICE

HANS KATTWINKEL, OF COSWIG, GERMANY

FRICTIONAL BODY FOR COUPLINGS AND THE LIKE AND METHOD OF MAKING SAME

Application filed March 17, 1927, Serial No. 176,260, and in Germany March 17, 1926.

In couplings constructed according to the present practice fibrous materials of organic or inorganic nature are more and more being used for brake blocks or brake coverings, said fibrous materials consisting of a texture which is impregnated with varnish, artificial resin, water-glass or the like and hardened by drying and by applying pressure and heat thereto after being thus impregnated. Brake blocks or coverings of this kind have heretofore generally been secured to their carrier by means of rivets or the like. It has also been proposed in case of couplings with laminated coupling members to accomplish the connection between the brake covering and the carrier, which ordinarily consists of a disc of sheet steel, by providing holes on said disc and filling these holes with punched out pieces of the impregnated texture before hardening. These pieces of impregnated texture are thereupon firmly secured to the disc by upsetting and subsequent hardening.

This procedure is inconvenient and cumbersome and in addition has the disadvantage, that the available frictional surface for given dimensions of the disc-shaped carrier cannot fully be utilized for the frictional effect, because the perforations of the disc-shaped carrier serving for the reception of the several pieces of the frictional material cannot be arranged too closely adjacent to each other, because this would essentially reduce the mechanical strength of the said carrier, whose strength is mainly based upon the coherence of the relatively small parts intermediate the perforations. A further disadvantage of the frictional brake blocks or brake coverings which are made according to the known processes consists therein, that the several pieces of the frictional material will easily become loose thereby giving rise to troubles.

According to this invention these disadvantages are avoided by applying the frictional covering as a plastic mass in a continuous layer extending essentially over the entire surface of the disc-shaped carrier, whereby a firm connection with the said carrier and the covering will be brought about by pressing said mass into said disc and more particularly into the perforations provided therein. This is preferably done in such a manner that the disc-shaped carrier is covered by the frictional material on both of its sides, so that the two layers of said material will be united with each other at the places of the perforations of the disc-shaped carrier, thus providing an especially strong connection of said mass with said carrier.

The accompanying drawings show two forms of constructions of the brake block or brake covering made according to the process forming part of this invention. In the drawings, Fig. 1 represents a completed frictional disc made according to this invention, the under portion of this figure being a view of the completed frictional covering and the upper portion showing the respective part of the disc-shaped carrier before application of the frictional material.

Fig. 2 is a section through the disc-shaped carrier along the line II—II of Fig. 1, while

Figure 4:
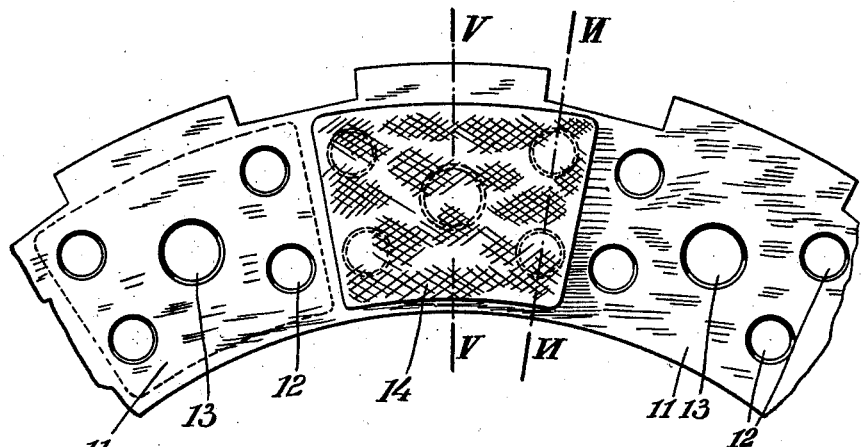
Fig. 4 represents a portion of a frictional body made according to this invention, said frictional body being of ring-shaped conformation; the middle part of this figure being a view of the completed frictional covering, while the outer parts of this figure show the disc-shaped carrier in uncovered condition.
Figures 5, 6:
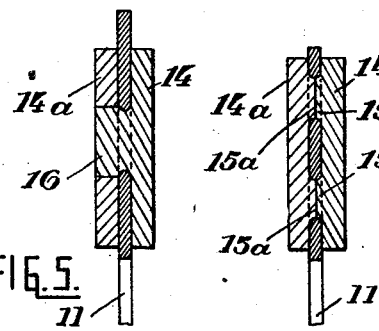
Fig. 5 is a section along the line V—V of Fig. 4.

Fig. 6 a section along the line VI—VI of Fig. 4, and

Figure 7:
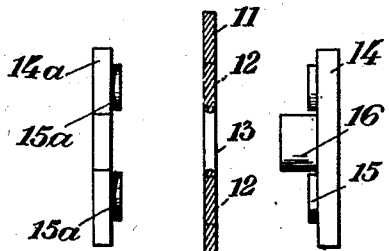

Fig. 7 represents partly a section and partly a side view showing the mode of connection of two opposed pieces of the covering together with the disc-shaped carrier.

Figure 1:
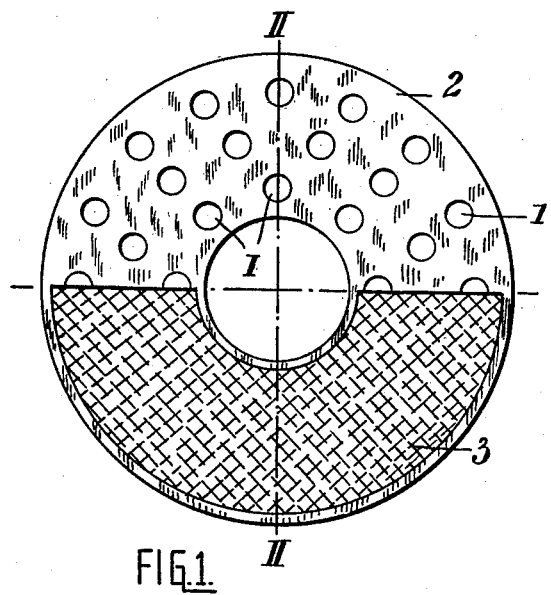
Figure 2:
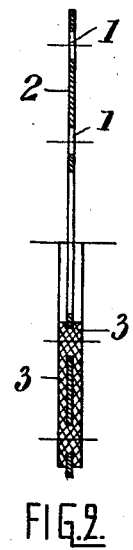
Figure 3:
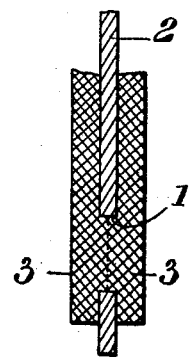
Fig. 3 shows a detail on an enlarged scale.

In the construction according to Figs. 1 to 3, whereby the carrier for the frictional material forms a circular disc with a relatively small central aperture, the frictional covering is preferably applied in such a manner, that the disc 2, which may be made from sheet steel, is provided with a large number of perforations 1 and that the frictional covering 3 is applied on both sides of said disc. This frictional covering consists in the preferred construction of a mixture of asbestos fibers and a binding agent such as for instance artificial resin produced by the condensation of a phenol with formaldehyde, and is added in dissolved condition to said asbestos fibers. This mass, which is preferably applied to the disc-shaped carrier in the form of discs of ring-shaped conformation corresponding to the final shape to be given to the frictional covering, or in any case in the form of a greater coherent surface, is still fully plastic before hardening, so that it may easily be pressed into the perforations 1 of the disc-shaped carrier 2. The two layers will thus come into intimate contact with each other within the perforations, as may be seen from Fig. 3, and therefore firmly adhere to each other. After hardening of the mass, which takes place in the ordinary manner at increased temperature, preferably maintaining the pressure applied for pressing said mass into the perforations of the disc-shaped carrier, the two layers of the frictional covering will be intimately welded with each other, so that the frictional covering will positively be prevented from becoming loose even, if the heaviest strains are imposed thereon. After hardening of the covering the frictional disc is preferably smoothly ground upon both sides in order to bring about an intimate frictional contact with the adjacent plates of the coupling which ordinarily consist of bare steel discs, and in order to obtain a construction having the smallest possible dimensions in axial direction.

Instead of the above-mentioned plastic mixture of asbestos fibers and artificial resin of course also frictional masses may be employed which consist of other fibrous materials and binding agents. The frictional material may also be applied in the form of a texture which is impregnated with a hardening agent, because the frictional material will in this form also be of sufficient plasticity before hardening in order to fill up the perforations in the disc-shaped carrier and to bring about a welding of the two layers of texture at their points of contact, after being pressed upon the carrier. Instead of asbestos also fibrous materials of another kind, such as cotton, hemp as well as brass wires or the like may be employed either singly or combined. It may eventually also be advisable to undercut or dove-tail the walls of the perforations 1, which of course need not be of circular conformation, in order to increase the adherence of the frictional mass to the carrier especially in case only a one-sided covering is provided on the latter.

It will be immediately apparent that with a frictional disc made according to this invention the available surface may be far better utilized than with the known constructions, whereby only those parts of the frictional material will be effective which are positioned within the perforations of the disc.

A further advantage of the construction according to this invention consists therein, that the frictional covering will be prevented from becoming loose even after heavy wear, because the coherence existing between the adjacent parts which are secured in position by engagement with the perforations of the disc will warrant a firm connection of the entire frictional mass and the disc-shaped carrier, even after the frictional mass has been worn down nearly to the carrier.

According to the constructions shown in Figs. 4 to 7 the frictional covering is applied not in coherent pieces but in individual sector-shaped pieces, which supplement each other to form an almost closed annular surface practically fully covering the entire disc of sheet steel. The ring 11 is provided with a large number of groups of perforations. Each of these groups of perforations consists in the construction as represented of five perforations, of which the four smaller perforations 12 are positioned at or approximately at points which define a trapezoid, while a greater perforation 13 is provided at the center. The pieces 14 and 14a of the frictional covering are provided in pairs as may be seen from Figs. 5 and 6. The pieces 14 and 14a are of the conformation of a sector of an annular disc and are arranged one beside the other at relatively small peripheral distances.

According to the arrangement of the perforations 12 and 13 projections 15, 15a and 16 are provided on the opposite faces of the frictional members 14 and 14a. These projections are integral with the frictional members which are made from the above-mentioned materials and are formed on said members simultaneously with the latter. The height of the projections 15 and 15a is dimensioned in accordance with the thickness of the disc-shaped carrier 11 in such a manner that the end surfaces of said projections will abut against each other. The central projection 16, however, is made of essentially greater length, the length of this projection being about equal to the sum of the thicknesses of the disc-shaped carrier and the thickness of the oppositely positioned piece 14a of the frictional covering. The piece 14a is provided at a point opposite the projection 16 with a proper bore with which said projection comes in engagement when assembling the device. The edges of the bores 12, 13 of the disc-shaped carrier are preferably somewhat rounded-off, as shown in Figs. 5 and 6.

The connection of the frictional members with the disc-shaped carrier is accomplished as follows: The frictional members which have been provided with the projections 15, 15a and 16 during the pressing of the impregnated fibrous material in cold condition before the hardening of the impregnating material takes place, are applied on either side to the disc-shaped carrier 11, whereby the projections will engage the bores 12 and 13. These bores must of course exactly register with the projections. After all frictional members have been mounted in this manner, whereby the projections 16 will engage the bores of the oppositely positioned frictional members, the entire disc is placed into a hydraulic press and exposed to a heavy pressure. In this condition now the hardening of the frictional material takes place as usual under development of heat, so that the oppositely positioned frictional members 14 and 14a will be completely welded with each other. Prior to applying the frictional members, the latter as well as the disc-shaped carrier 11 are preferably coated with the binding agent which is employed for making up the frictional material in order to render the connection between the frictional members and the disc-shaped carrier 11 as intimate as possible.

It is of course not necessary to provide both frictional members of the co-operating pairs with projections which project exactly as far as to the center of the disc-shaped carrier, as assumed in the represented construction. Instead thereof the projections may, for instance, alternately pass entirely through the bores of the disc-shaped carrier from the one or the other side of the latter. An essential feature of this construction consists therein, that said projections are so arranged that they are able to come in intimate contact and unite with the material of the oppositely positioned frictional member.

I claim:

1. The method of forming frictional bodies for clutches, brakes and the like which consists in providing a core plate with groups of perforations each group including a central perforation and marginal smaller perforations, providing preformed sections of plastic frictional material having marginal studs, one section having a central opening, the other a central projection, applying said respective sections to the opposite sides of said core-plate to cause the studs to enter the said marginal perforations of a group, and to cause the said projection on one section to pass through the central perforation of the said group and through the said central opening of the opposite section, then welding the said sections so assembled to form a homogeneous mass interlocked through said perforations and presenting frictional faces at the opposite sides of said core-plate.

2. A method, in combination with a foraminous supporting plate, which consists in first pre-forming a plastic friction material mass into friction facing plates, and forming simultaneously therewith on one side of said facing plates a plurality of integral uniting projections, and then assembling said plastic facing plates with the integrally formed projections thereon in assembly with and through said foraminous supporting plate to unite said facing plates on opposite sides of and to the surfaces of said supporting plate and then fusing the preformed facing and foraminous plates into a homogeneous completely adherent mass.

3. The method of making brake rings and the like, consisting in providing a metal ring support having perforations, preforming members of frictional plastic material, and simultaneously providing substantially half of said members with a plastic unitary uniting projection and a corresponding hole in other members; passing said projection of one member through a hole in said metal ring support and through the hole in one of the said other members; then fusing said members into a homogeneous mass to form opposite braking surfaces.

4. The method in combination with a foraminous plate, consisting in preforming members in pairs of plastic frictional material, one of said members being simultaneously preformed with an integral central long stud and shorter studs, the other of said plates of a pair, being pre-formed with a central opening and shorter studs assembling said members with the studs of each member extending through said plate, then uniting by fusing the shorter studs together and the said long stud into and with the opposite frictional member for forming a homogeneous mass having opposite friction surfaces.

5. The method of forming a brake member, which consists in forming a plate with openings of different sizes, preforming pieces of plastic frictional material each having studs to enter some of said openings, some pieces having centrally arranged openings corresponding to the larger holes in said plate, and some of said pieces having integral studs to enter the larger of said holes in said plate and through the said centrally arranged openings, then fusing the frictional material to form homogeneous masses, each mass constituting two face braking surfaces.

6. The method of forming a brake member, which consists in forming a metallic plate with a plurality of holes some larger but of like size others smaller but of like size, preforming a number of male and female pieces of plastic frictional material, all of said pieces having studs to enter the smaller holes, some of said pieces having holes corresponding to the said larger holes, and some of said pieces having central studs of plastic material adapted to pass through the said larger holes of said plate and through the larger holes of said pieces, said uniting studs being integral with said pieces and in a plastic state, then uniting said pieces by fusing into a homogeneous mass to form opposite braking surfaces.

7. The method in combination with a foraminous supporting plate, which consists in preforming male and female friction members and providing simultaneously with the forming thereof with plastic studs to enter and unite in some of said holes in said ring, the male members being further simultaneously formed with a central stud and the female members being further simultaneously formed each with a central hole corresponding substantially in size and shape to said central studs, said shoe members when assembled with the supporting plate and fused with the said central stud of one member extending through the central hole of the other member forming braking surfaces on the opposite sides of said foraminous ring.

In testimony whereof I affix my signature.

HANS KATTWINKEL.